Figure 1:
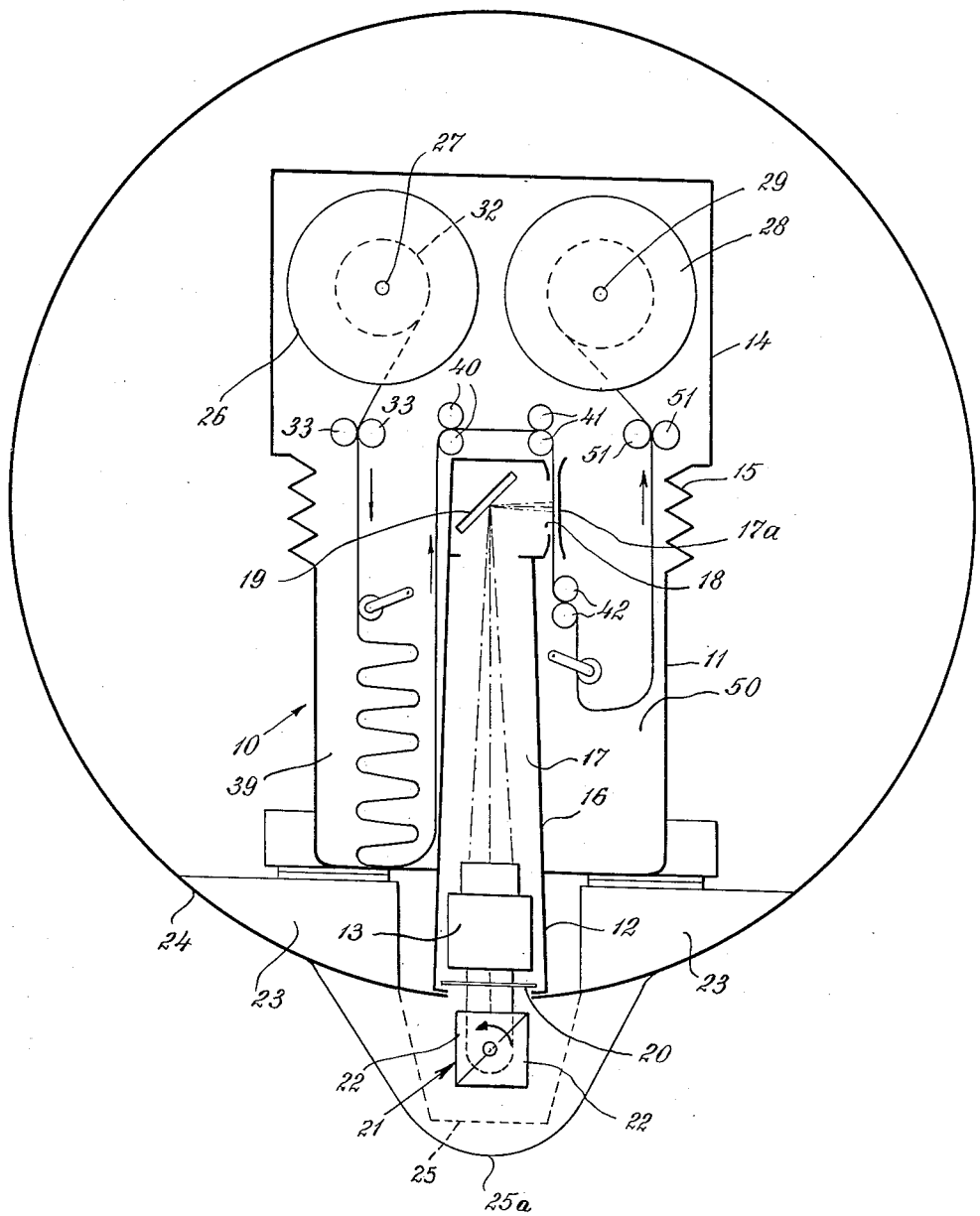

April 15, 1952     J. G. BAKER     2,593,088
PANORAMIC CAMERA

Filed Aug. 23, 1949     2 SHEETS—SHEET 2

INVENTOR.
James G. Baker
BY
Reirie Edmonds, Morton Barrows
ATTORNEYS

Patented Apr. 15, 1952

2,593,088

UNITED STATES PATENT OFFICE 2,593,088

PANORAMIC CAMERA

James G. Baker, Orinda, Calif., assignor to The Perkin-Elmer Corporation, Glenbrook, Conn.

Application August 23, 1949, Serial No. 111,869

5 Claims. (Cl. 95—15)

This invention relates to cameras of the panoramic type and is concerned more particularly with a novel camera, which may be employed, while held stationary, in taking pictures covering a field of 180° upon a film moving past a slit in the focal plane of the lens system. The new camera is especially adapted for aerial use in high altitude precision reconnaissance over wide areas and a form of the camera suitable for that application will, accordingly, be illustrated and described in detail for purposes of explanation.

In recent years, aerial mapping and reconnaissance have commonly been carried on by means of a camera equipped with a wide angle lens operating with a shutter of some kind on a field of fixed size and with the film at rest. While the speed of such a lens may be satisfactory, the lens lacks the desired resolution and contrast, does not give acceptable corner illumination, and is afflicted with considerable oblique spherical aberration, mingled with residuals of other aberrations. Various optical expedients have been tried to obtain improved resolution and greater coverage, but gains in those respects have been at the expense of distortion, flatness of field, speed, difficulties in printing, etc. An increase in field may also be obtained by the use of a plurality of cameras arranged in a row transverse to the line of flight but such an installation occupies much space in the airplane and is very heavy.

Mechanical systems for wide angle coverage, which have been proposed and utilized to some extent heretofore, include, in some instances, a camera on a mount, which permits the camera to be redirected after each picture is taken, so that a double row of pictures with a suitable transverse overlap can be made along the line of flight. Because of the overlap, the coverage obtainable is not twice that afforded by the camera at rest and the installation takes up much space and requires large magazines.

In another mechanical system for wide angle coverage, the camera is of the type used in strip photography and includes a slit in the focal plane. During exposure of the film, the lens and slit are rotated about a fixed point and the film is advanced across the slit in such manner as to be stationary relative to the ground. In such a system, the space available in the airplane imposes a limit on the focal length of the moving lens and, as a result, lenses of short focal length are required and, ordinarily, the lenses do not have a focal length much in excess of 12 inches. As angular resolution can be expected to improve, although not linearly, with focal length, it is apparent that this system cannot give the desired results.

The present invention is directed to the provision of a camera suitable for high altitude precision reconnaissance and mapping, which may be employed, while held stationary, in taking pictures with horizon to horizon coverage. This novel result is achieved by providing the camera with an optical system which includes means for causing light from successive portions of the terrain transverse to the line of flight to pass in continuous fashion into the lens during the taking of a picture. Such sweeping means take the form of a head prism consisting of two like right angle prisms having their hypotenuse faces metallized for reflecting purposes and held in actual or near contact, the head prism forming a parallelopiped and being rotatable on its longitudinal axis. When installed in an airplane, the camera is ordinarily mounted with its optical axis vertical and the head prism then lies just beneath the bottom of the fuselage with its axis of rotation lying along the line of flight. During its exposure, the film is transported across a focal plane slit extending parallel to the line of flight, at a rate synchronized with the rotation of the head prism. The film magazine includes a supply spool and a take-up spool and, in order that the film moving across the slit may be brought up to speed quickly and without rotating the supply spool at such speed, the film is fed from the supply spool into a loop, from which the portion required for a single exposure may be drawn for transport across the slit. The film, that has passed the slit, is then fed into a second loop, from which it is withdrawn to be wound up. With this arrangement, the film may be fed continuously from the supply spool and wound up continuously upon the take-up spool, while the movement of the film across the slit is intermittent.

The camera may be equipped with any standard type of lens designed to meet the speed and field angle requirements and, since it is necessary for the lens to cover only the width of the film, the field angle is sufficiently restricted as to permit improved resolution and described vignetting.

Figure 2:
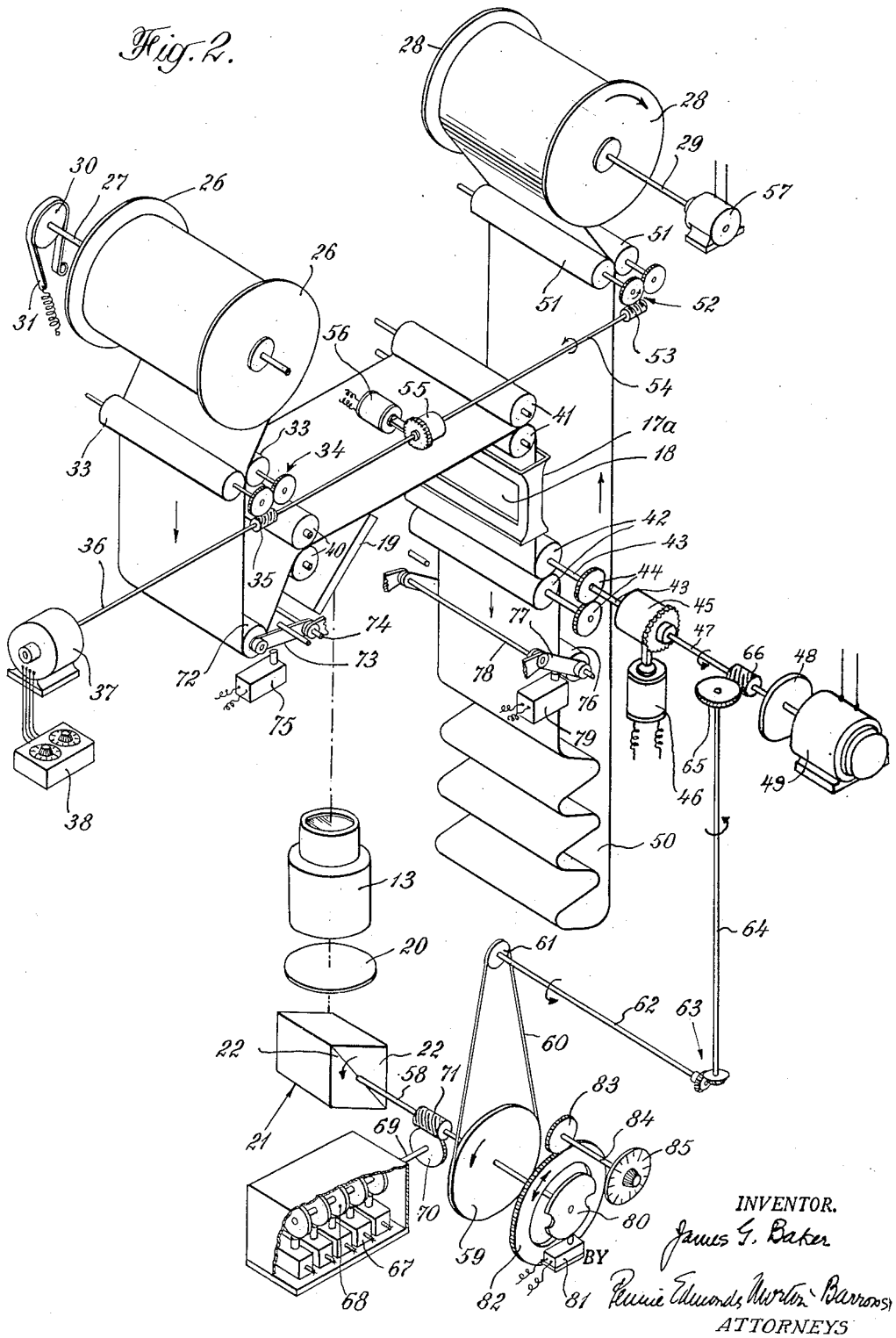

For a better understanding of the invention, reference may be had to the accompanying drawings, in which Fig. 1 is a diagrammatic vertical sectional view showing the camera installed in an airplane with its elements in proper position for the start of a picture-taking operation; and Fig. 2 is a diagrammatic perspective view of the operating mechanism of the camera with its elements in the position assumed at the end of a picture-taking operation.

The camera, as shown in Fig. 1, comprises a housing 10 made up of the camera body 11 having an extension 12 containing the lens system 13, and a film magazine 14, which may be connected to the camera body through a light-proof bellows 15. The walls of the extension 12 continue inwardly, within the camera body, as indicated at 16, to define a passage 17, one lateral wall of which is formed with a slit 18 and, if desired, is provided with a film guide 17a outside of the slit. A mirror 19 is mounted in the passage opposite the slit to permit an erect image to be focused upon the slit. The outer end of the passage is closed by a light filter 20, beyond which a head prism 21 is mounted for rotation on an axis parallel to the length of slit 18. The head prism is made up of two right angle prisms 22 having their hypotenuse faces aluminized or silvered and held in actual or near contact, and in order to lighten the weight, excess glass may be trimmed from the two prisms. When the camera is installed in an airplane, the portion of the camera containing the optics, slit, film advancing and guiding means, etc. is supported on a shockproof mounting made up of members 23, 23 and with its optical axis ordinarily vertical. The head prism and its mounting then lie below the bottom of the fuselage 24 of the airplane within a transparent window 25, which may be partially enclosed in a transparent blister 25a, although the blister may be omitted, if desired.

The film supply is in the form of a roll on a spool 26 mounted on an arbor 27 and the used film is wound on a take-up spool 28 on an arbor 29. The arbors are supported for rotation within the magazine on opposite sides of the optical axis of the camera. The supply spool arbor 27 is provided with a disc 30, to which drag is applied by a brake band 31, so that the spool will not overrun.

Film is drawn from the supply spool by feed rollers 33 pressing tightly against opposite sides of the film. The shafts of the rollers are connected by gearing 34 and one of the gears is driven by a worm 35 on a shaft 36 operated by a metering motor 37, the speed of which can be closely regulated by a controller 38. In the use of the camera, the metering motor rotates continuously at a rate determined by the length of the intervals between successive pictures and by the lateral coverage of each picture. The film fed by rollers 33 enters a compartment 39 in the camera body at one side of the passage 17 to form a loop, and the film passes upwardly from the loop and is guided across the upper end of the passage by pairs of rollers 40, 41. The film passes from rollers 41 downwardly through guide 17a past slit 18 and between a pair of transport rollers 42, the shafts 43 of which are connected together by gears 44. The shaft of one of the transport rollers is connected to one member of a clutch 45, which is operable electrically by a solenoid 46. The other member of the clutch is attached to a shaft 47, which is provided with a fly wheel 48 and is driven by a main drive motor 49 capable of operating at different speeds. From the transport rollers 42, the film is fed into a compartment 50 within the camera body on the slit side of passage 17 to form a second loop.

Film is withdrawn from the second loop by take-up rollers 51 having their shafts connected by gearing 52, and the gear on one shaft is driven by a worm 53 on a shaft 54. Shaft 54 is connected to one member of a clutch 55 controllable by a solenoid 56 and the other member of the clutch is mounted on shaft 36. The arbor 29 of the take-up spool 28 is driven by a torque motor 57.

The head prism 21 is attached to a shaft 58 carrying a pulley 59 connected by belt 60, which is preferably a steel tape, to a pulley 61 on a shaft 62. Shaft 62 is connected through gearing 63 to a shaft 64 having a gear 65 driven by a worm 66 on shaft 47. During the operation of the camera, motor 49 drives shaft 47 continuously and the head prism is, accordingly, rotated continuously. Whenever a picture is to be taken, solenoid 46 is energized to throw in the transport clutch 45 and connect shaft 43 to shaft 47. The transport rollers 42 are thereupon driven and film drawn from the first loop is transported across the slit and fed into the second loop.

In the taking of a picture covering a field of 180°, a 90° movement of the head prism is required and the taking of the picture starts when the hypotenuse faces of the head prism extend at 45° toward one side of the vertical and is completed when the faces extend at 45° toward the other side of the vertical. It is thus possible to take two pictures for each complete revolution of the head prism and the minimum interval between successive pictures is equal to the time required for the head prism to make a quarter-revolution. It may be desirable, however, to make pictures at greater intervals and the camera is provided with means for selecting the intervals between successive pictures. Such means include a bank of switches 67 operated by respective cams 68 on a shaft 69 having a gear 70 driven by a worm 71 on shaft 58. The switches are in a circuit with the solenoid 46 of the transport clutch 45 and, during a given run, only one switch is used. The cams 68 driving the switches have different numbers of operative portions, the first cam having a single such portion and each succeeding cam having one more operative portion than the cam ahead of it. The shaft 69 is then driven at a speed, which is a sub-multiple of the speed of rotation of the head prism, so that the first cam may, for example, actuate its switch and thus throw in the transport clutch once for a given number of half-revolutions of the head prism. The other cams have operating portions increasing successively in number along the series, so that by selection of a given switch 67, pictures can be taken at intervals in terms of half-revolutions of the head prism.

When the transport clutch 45 is thrown in and the transport rollers 42 begin to rotate, the amount of film transported across the slit is determined by the amount of film in the first loop. As the film is drawn from that loop, the loop is shortened and, when the loop has diminished to a selected point, the film operates means for throwing out the transport clutch. Such means include a roller 72 lying within the loop of film and mounted on the ends of arms 73 pivotally mounted on a rod 74. One of the arms normally engages the operating button of a switch 75 and, so long as the film in the loop is out of contact with roller 72, arm 73 depresses the button of a switch 75, which is in the circuit with switches 67 and the solenoid 46 of the transport clutch. As the transport rollers withdraw film from the first loop to shorten the loop, the film in the loop will ultimately engage and raise roller 70, freeing arm 73 from the button of switch 75. The switch will thereupon open the circuit through solenoid 46 and the transport clutch 45 will be disconnected, so that the transport rollers 42 will come to rest.

During the operation of the camera, the take-up rollers 51 are intended to operate continuously, and the second loop of film, which is stored in compartment 50, is shortened by the operation of the take-up rollers during each period of rest of the transport rollers 42 and is then lengthened as the transport rollers feed more film into the loop. In order to prevent the take-up rollers from continuing to operate when the second loop of film has been shortened to a selected extent, a roller 76 mounted on arms 77 pivoted on a rod 78 lies within the loop with one of the arms 77 normally engaging the operating button of a switch 79 in circuit with solenoid 56 controlling the take-up clutch 55. Whenever the second loop of film is shortened by the action of take-up rollers 51 to the point where the film engages and raises roller 76 to free its arm 77 from the button of switch 79, the switch opens the circuit through solenoid 56, clutch 55 is disconnected, and the take-up rollers 51 come to rest. When additional film is fed into the second loop by the transport rolls, roller 76 drops and its arm 77 closes switch 79, the take-up clutch is thereupon thrown in, and rollers 51 again begin to take up film. The torque motor 57 applies continuous torque to the arbor 29 of the take-up spool and is so constructed that it drives the arbor and take-up spool at a rate somewhat faster than that at which film is supplied to the spool by rollers 51. The motor does not apply sufficient torque to the arbor to rupture the film and is, in effect, a slip drive means for the arbor of the take-up spool.

In some circumstances, it may be desired to take pictures with less than 180° coverage and this is accomplished by starting the movement of the film across the slit by the engagement of the transport clutch, at a time when the faces of the head prism lie at less than 45° to the vertical and are approaching the vertical. In order to vary the point in the rotation of the head prism at which the transport clutch is thrown in, shaft 58 is provided with a cam disc 80 operating a switch 81 mounted on a ring 82 having gear teeth engageable with a gear 83 on a shaft 84 carrying a dial 85. The disc 80 has a pair of diametrical notches in its rim, which the operating button of switch 81 may enter and, by rotation of dial 85, ring 82 and switch 81 may be placed in a selected angular position, so that the switch button will enter one of the notches in the disc when the hypotenuse faces of the prism lie in a selected angular relation to the vertical. The switch 81 controls the action of the switches in bank 67, so that, even though one of those switches may have been actuated by its cam, solenoid 46 will not be energized to throw in the transport clutch 45, until the button of switch 81 has entered a notch in disc 80. By angular adjustment of disc 80, the point in the rotation of the head prism, at which one of the switches of bank 67 becomes effective, can be varied as desired. When pictures of less than 180° coverage are to be taken, the speed of metering motor 37 will be appropriately reduced.

In the use of the new camera for aerial reconnaissance and mapping, it is mounted in the aircraft with the slit 18 and the axis of rotation of the head prism 21 lying along the line of flight. The altitude, at which the pictures are to be taken, the speed of the airplane, and the desired amount of overlap of successive pictures will then determine which of the picture interval selector switches in bank 67 is to be used and the appropriate switch will be connected in circuit with the transport clutch. The angle of the coverage will then be selected by proper adjustment of switch 81 in relation to its cam disc 80. The final adjustment is that of the control device 38 for metering motor 37, so that the motor may operate continuously to supply the required amount of film to the first loop.

During the flight, the head prism is rotated continuously and, at the proper intervals, the transport clutch is thrown in by the picture interval selector switch then functioning. As a short time is required to bring the film up to speed by the transport rollers, the transport clutch is thrown in slightly in advance of the instant that the head prism is in proper angular position for the start of a picture. The transport rollers advance the film past the slit in synchronized relation to the movement of the head prism, until the first film loop has shortened sufficiently to cause switch 75 to function to throw out the transport clutch. While the pictures are being made and during the intervals between pictures, the take-up rollers are continuously drawing film from the second loop to be wound on the take-up spool, the rollers being stopped only if the film in the loop causes roller 76 to actuate switch 79 to throw out the take-up clutch.

The drive motor 49 can be run at different speeds and the slit is provided with a movable side, so that its width may be varied. Variations in exposure time may thus be obtained for different conditions of operation.

The lens system of the camera may have a focal length much greater than that of the wide angle lenses now employed in stationary cameras for aerial work and may thus give greater resolution. In order to obtain the full advantage of the use of a long focal length lens system of high resolution, it is necessary to compensate for the longitudinal drift of the image along the slit caused by motion of the plane. Such image motion compensation can be provided in various ways, one of which is to support the camera and head prism on a mount, which is rocked on a horizontal axis transverse to the line of flight at a rate dependent upon plane speed and altitude. During exposure, the rocking motion is in one direction, and the camera and prism are returned to their original positions during the interval between successive pictures.

I claim:

1. A panoramic camera for use on an aircraft for taking a picture of a strip of terrain extending from one horizon to the opposite horizon which comprises a light-proof housing, a passage defined by light-proof walls leading upwardly into the housing from the lower end thereof and spaced from the vertical walls of the housing to provide a pair of compartments extending substantially the length of the housing on opposite sides of the passage, the passage having an opening admitting light at its lower end and one of the vertical walls of the passage being formed with a horizontal slit, a pair of arbors mounted within the housing adjacent the upper end thereof, each of said pair of arbors being mounted above one of said compartments and having its axis parallel to the long axis of the slit, a film supply spool on one arbor and a film take-up spool on the other arbor, a refracting-reflecting element made of a pair of prisms having their hypotenuse faces in contact and acting as a reflecting plane, the element being mounted for rotation in front of the lower end of the passage on a horizontal axis lying in said plane and parallel to the long axis of the slit, means for continuously rotating the element at a uniform rate, means for drawing film from the supply spool and feeding it into the adjacent compartment, means mounted at the top of the passage for guiding the film from said first compartment over the upper end of the passage and into the second compartment, means within the second compartment for engaging the film and transporting it through the guiding means from the first compartment into the second compartment, said transporting means lying beyond the slit, means actuated in timed relation to the rotation of the element for starting the operation of the transport means at regular intervals, each transport operation beginning when the element is directing light into the passage and its reflecting plane is approaching the vertical, means for stopping the action of the transport means when the reflecting plane of the element has passed through the vertical and a selected length of film has passed the slit, an optical system within the passage receiving light from the element and focusing an image upon the film through the slit, erecting mirror means between the optical system and the slit for erecting the image, and means for rotating the take-up arbor to withdraw film from the second compartment and wind it upon the take-up spool.

2. A panoramic camera as defined in claim 1 in which said element is mounted for rotation outside and below the lower end of said passage.

3. A panoramic camera as defined in claim 1 in which said starting means is adjustable to vary the length of the intervals between its operations.

4. A panoramic camera as defined in claim 1 in which the film is fed into each of said pair of compartments in the form of loops, and having means operable by the film in at least one of said loops to render said transporting means inoperative when said loop is shortened beyond a predetermined limit.

5. A panoramic camera for use on an aircraft for taking a picture of a strip of terrain extending from one horizon to the opposite horizon which comprises a light-proof housing, a passage defined by light-proof walls leading upwardly into the housing from the lower end thereof and spaced from the vertical walls of the housing to provide a pair of compartments extending substantially the length of the housing on opposite sides of the passage, the passage having an opening admitting light at its lower end and one of the vertical walls of the passage being formed with a horizontal slit, a pair of arbors mounted within the housing adjacent the upper end thereof, each of said pair of arbors being mounted above one of said compartments and having its axis parallel to the long axis of the slit, a film supply spool on one arbor and a film take-up spool on the other arbor, means for continuously rotating said pair of arbors, a refracting-reflecting element made of a pair of prisms having their hypotenuse faces in contact and acting as a reflecting plane, the element being mounted for rotation in front of the lower end of the passage on a horizontal axis lying in said plane and parallel to the long axis of the slit, means for continuously rotating the element at a uniform rate, means for drawing film from the supply spool and feeding it into the adjacent compartment, means mounted at the top of the passage for guiding the film from said first compartment over the upper end of the passage and into the second compartment, means within the second compartment for engaging the film and transporting it through the guiding means from the first compartment into the second compartment at a rate having a constant relation to the rotation of the element, said transporting means lying beyond the slit, means actuated in timed relation to the rotation of the element for starting the operation of the transport means at regular intervals, each transport operation beginning when the element is directing light into the passage and its reflecting plane is approaching the vertical, means for stopping the action of the transport means when the reflecting plane of the element has passed through the vertical and a selected length of film has passed the slit, an optical system within the passage receiving light from the element and focusing an image upon the film through the slit, and erecting mirror means between the optical system and the slit for erecting the image.

JAMES G. BAKER.

REFERENCES CITED

The following references are of record in the file of this patent:

UNITED STATES PATENTS

| Number | Name | Date |
| --- | --- | --- |
| 1,987,064 | Hopkins | Jan. 8, 1935 |
| 2,335,768 | Davies | Nov. 9, 1943 |
| 2,365,212 | Oriol | Dec. 9, 1944 |
| 2,371,836 | Masterson | Mar. 20, 1945 |
| 2,487,671 | Pratt | Nov. 8, 1949 |